United States Patent [19]

Grise

[11] 4,270,871

[45] Jun. 2, 1981

[54] EXPANSION JOINT

[76] Inventor: Frederick G. J. Grise, P.O. Box 186, Osterville, Mass. 02655

[21] Appl. No.: 864,708

[22] Filed: Dec. 27, 1977

[51] Int. Cl.[2] .................................................. F16B 1/00

[52] U.S. Cl. ........................................................ 403/29

[58] Field of Search .............................. 403/29, 30, 28; 285/187, DIG. 6

[56] References Cited

U.S. PATENT DOCUMENTS

| | | | |
|---|---|---|---|
| 328,885 | 10/1885 | Griscom | 403/30 |
| 1,295,263 | 2/1919 | Blom | 285/187 |
| 2,443,688 | 6/1948 | McFarland | 403/29 |
| 2;646,997 | 7/1953 | Magos et al. | 285/187 |

FOREIGN PATENT DOCUMENTS

| | | | |
|---|---|---|---|
| 468948 | 12/1928 | Fed. Rep. of Germany | 403/28 |

*Primary Examiner*—Andrew V. Kundrat
*Attorney, Agent, or Firm*—Charles R. Fay

[57] ABSTRACT

An elongated metal bolt embedded in a brick and means at the ends of the bolt for holding the same tightly to the ends of the bricks, and collars inserted between the ends of the bricks and the nuts to balance the difference in expansion of the bolt and the brick under conditions of heat.

2 Claims, 2 Drawing Figures

EXPANSION JOINT

SUMMARY OF THE INVENTION

An elongated metallic member hereinafter referred to as a bolt is anchored or extends through a brick molded of suitable materials for instance for a heat retaining magma or for a furnace etc. The coefficient of expansion under heat for the brick and the bolt are different and to preserve the tightness of any connection that may be used or desired at an exposed area of the bolt, there is provided a collar or collars of a material chosen from a group wherein the coefficient expansion thereof is sufficient to take up the looseness of the bolt as it expands to a greater degree than the brick.

DISCUSSION OF THE PRIOR ART

Applicant is aware of no prior art relevant to this invention; but attention is directed to Ser. No. 658,698 filed Feb. 17, 1976 and now U.S. Pat. No. 4,085,333, and Ser. No. 854,615, filed Nov. 25, 1977.

PREFERRED EMBODIMENT OF THE INVENTION

Figure 1:
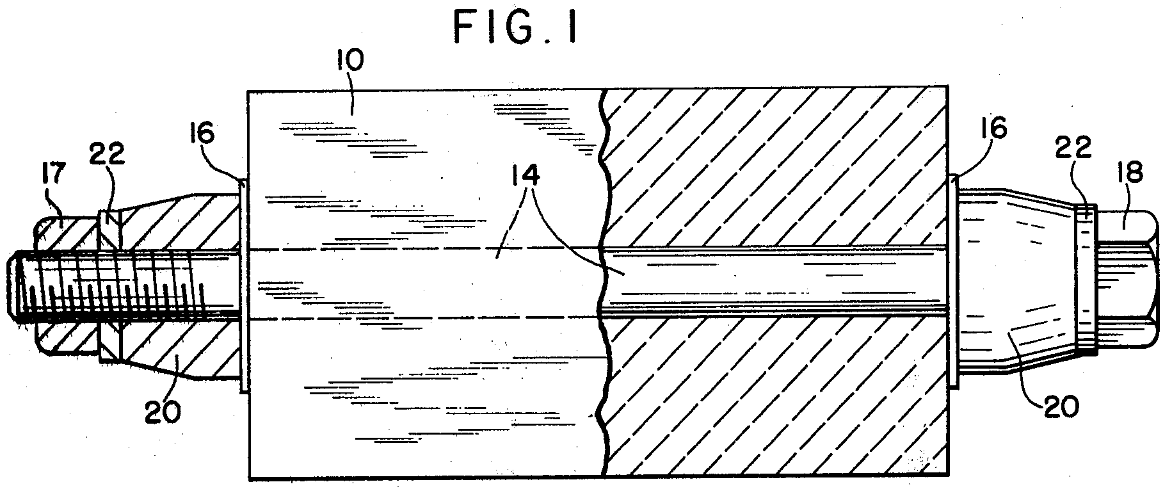
FIG. 1 illustrates a bolt embedded in a brick and showing the invention.
Figure 2:
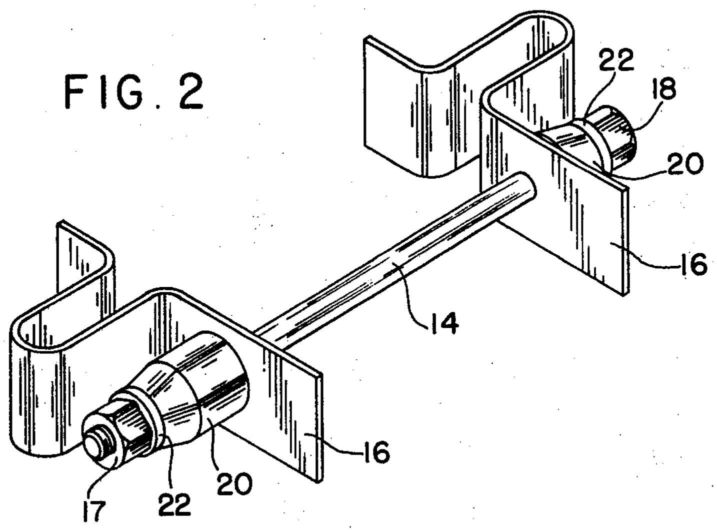
FIG. 2 is a perspective view on a reduced scale illustrating the application of the bolt to an electric circuit.

In FIG. 1 the reference character 10 indicates a member through which a threaded metallic bolt 14 is passed through any kind of a bore, or bolt 14 may be fused into the member 10 in the first instance.

Member 10 is e.g., a brick or an end portion thereof, or a portion of a brick which it is desired to be heated as for instance in a heat retaining magma, or in a furnace or any other relationship where it may be found desirable.

In an illustration of the invention, electricity conducting elements or connections 16 are placed tightly against the brick 10 and are held as for instance by nut 17 and bolt head 18 at the ends of the bolt. In this case, however, when the brick heats up (by any means) to a certain degree, the bolt 14 having a coefficient of expansion greater than that of the brick 10, will expand with relation to the brick even though the brick itself also expands to some degree, and thus the connections at 16 would become loose thereby losing or impairing its electrical contact with the brick.

To overcome this deficiency there are provided collars 20,20 in this case shown one at each end of the bolt.

It is also possible of course that all of the collar material 20 should be at one end of the bolt only as long as the invention is carried out as explained below. The reference characters 22,22 merely indicate washers which do not effect the invention in the present case.

The collar or collars 20 are of a material whose coefficient of expansion equals the difference between the coefficient of expansion of the bolt 14 and the brick 10.

This may be expressed as follows wherein;

$^{E}$brick equals coefficient of expansion of the brick material;

$^{E}$collar equals coefficient of expansion of the collar material;

$^{E}$bolt equals coefficient of expansion of the bolt material; and W equals dimension of the brick and L equals the length of the collar. (W+L) $^{E}$bolt $-$ $^{LE}$collar equals $^{WE}$brick.

Another example is: assuming the brick is six inches long and it has a coefficient of expansion of $7\times10^{-6}$ equals 0.042 inches; and the bolt is of steel and is eight and one third inches long with a coefficient of expansion of $8.4\times10^{-6}$ which equals 0.070 inches; it will be seen that the degree of looseness as for instance e.g., at temperature of 1,400° F., will be a total of 0.028 inches.

Therefore, our material for the collars is chosen from a group of materials having a coefficient of expansion of $12\times10^{6}$ e.g., manganese, and it takes a total of two and one third inches with an expansion of 0.014 inches in each collar 20 in order to maintain the pressure of the parts as they were originally and in this case the electric connections 16 will remain just as tight as ever regardless of the heat according to the above examples.

The collars 20 may be built up of appropriate multiple washers. Also, the brick 10 might be made of material that expands more than the bolt and in this case, allowance would have to be made to achieve the desired result.

I claim:

1. An expansion joint comprising a heat accepting brick, a bolt therein, a connection on the bolt against the adjacent face of the brick, means to hold the connection tightly to the brick, said means including a collar on the bolt, the coefficients of expansion of the brick, bolt, and collar being such as to balance the expansion of the brick, bolt, and collar to hold the connection tight under conditions of heat.

2. The expansion joint of claim 1 wherein the coefficients of expansion of the brick, bolt, and collar are approximately $7\times10^{-6}$; $8.4\times10^{-6}$; and $12\times10^{6}$, respectively.

* * * * *